Figure 1:
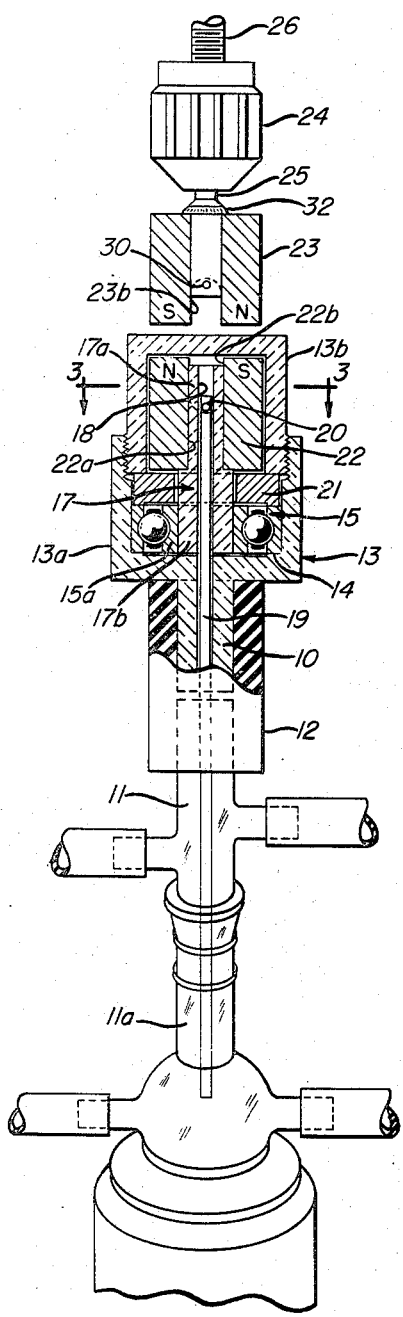

Feb. 26, 1957 N. G. FOSTER ET AL 2,783,401
SEAL AND MAGNETIC DRIVE
Filed Sept. 11, 1952

INVENTORS:
Norman G. Foster
Louis E. Green, Jr.
BY Everett A. Johnson
ATTORNEY

United States Patent Office 2,783,401
Patented Feb. 26, 1957

2,783,401

SEAL AND MAGNETIC DRIVE

Norman G. Foster, Fayetteville, Ark., and Louis E. Green, Jr., Tulsa, Okla., assignors to Standard Oil Company, Chicago, Ill., a corporation of Indiana Application September 11, 1952, Serial No. 309,034

5 Claims. (Cl. 310—104)

This invention relates to a vacuum or constant pressure seal and magnetic drive which is useful in the transmission of mechanical power into an evacuated space.

In connected with the operation of various pieces of apparatus at low pressures, it is necessary to have a rotating shaft in the system. For example, distillation columns employing a spinning band as packing have become quite popular in recent years. This type of spinning band column employs a rotating shaft and is described in Industrial Engineering Chemistry Analytical Edition, vol. 10 (1938), page 450. Many investigations have shown the outstanding characteristics of spinning band columns to be (1) low pressure drop, (2) low operating hold up, and (3) high efficiency. These features of spinning band columns apply also under vacuum operation but vacuum seals are difficult to maintain with laboratory equipment incorporating moving parts.

An ideal rotary seal would be non-leaking, would not consume much power through friction, and would require very little maintenance. Heretofore, attempts to solve this problem have usually employed a packing around a rotating shaft which enters the evacuated space. While this solution was expedient in some cases it does not meet the conditions for an ideal seal because it leaks, usually consumes considerable power due to friction, and ordinarily requires considerable maintenance.

It is, therefore, a primary object of our invention to provide a means for driving a rotating element which is substantially non-leaking even when employed to transmit power from a region at atmospheric pressure to a space maintained at a very low sub-atmospheric pressure. It is also an object of this invention to provide a vacuum seal and drive for a spinning band column which consumes little power through friction and with requires very little maintenance. These and other objects of the invention will become apparent as our description thereof proceeds.

Briefly, we attain the objects of our invention by eliminating the need for passing a drive shaft through a stuffing-box type of vacuum seal, and we have devised a magnetic drive permitting isolation of the column for pressure control. We provide a separable magnetic coupling between the rotated element and a suitable drive means. An opposed pair of cylindrical magnets is used, one in a vacuum tight housing at the head of the still and the other mounted for rotation outside the housing in axial alignment with the column.

The vacuum tight housing encloses anti-friction bearing means and the lower opposed magnet and is attached to the column by means of heavy walled pressure tubing. Two drops of a low vapor pressure oil may be used for lubricating the bearing and the vacuum tight housing threads are sealed with a resin after assembly. A clamp is used to hold the housing firmly in the desired position.

Figure 2:
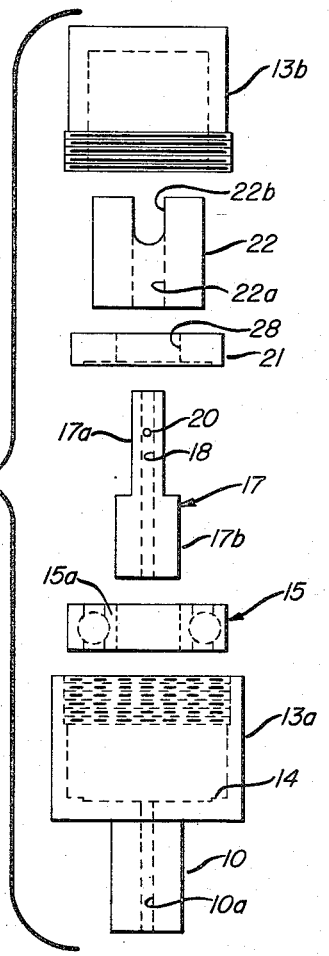
Figure 3:
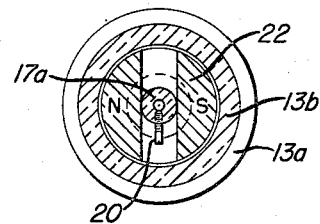

For a more complete understanding of the vacuum seal and rotary drive of this invention, reference is made to the accompanying drawing in which a specific embodiment is illustrated and wherein:

Figure 1 is an elevation partly in section;
Figure 2 is an exploded elevation of the components of the column seal assembly; and
Figure 3 is a section taken along the line 3—3 in Figure 1.

Referring to Figure 1, hollow stem 10 is a stationary member which is attached to the evacuated space by means of a flexible tubing 12. The hollow stem 10 is integral with the non-magnetic vacuum tight housing 13 comprising a lower cup-like portion 13a which is internally threaded and has a bottom recess providing an annular base shoulder 14 which supports the ball bearing assembly 15. A cap 13b for the seal assembly threads into the lower housing 13a to complete the vacuum tight unit 13. The inner race 15a of the ball bearing assembly 15 is fixed by a press fit to the lower end of drive pin 17 having a bore 18 adapted to receive the driven shaft 19 which transmits the power to the spinning band (not shown). The upper end of the driven shaft 19 is fixed to the upper end of the drive pin 17 at 20 by a set screw or its equivalent. A spacer disc 21 is slidable over the drive pin 17 and is positioned within the housing 13 as shown in Figure 1. This disc 21 is in compression between cap 13b and the outer race of bearing 15 so as to hold the race in fixed position on shoulder 14.

A first cylindrical magnet 22 having poles (N) and (S) is provided with a bore 22a which slips over the upper portion 17a of the drive pin 17. Relative rotation about the pin 17 and axial travel along the pin are avoided by set screw 20 operating within the U-shaped transverse slot 22b in the body of the magnet 22. Thus another function of set screw 20 is to engage the closed end of slot 22b and prevent magnet 22 from being drawn upwardly by magnet 23 to such an extent that the poles bear against the inner face of cap 13b. If contact between the cap and the magnet does occur, the poles of magnet 22 would wear away at the cap and this would slow down the shaft and actually cause complete loss of transmission of power.

A second cylindrical magnet 23 is supported by chuck 24 and a shaft 25, the chuck 24 being illustrated as rotated by shaft 26 which may be driven by a pulley or a motor (not shown). Magnet 23 is provided with an axial bore 23a and a U-shaped transverse slot 23b. Pin 30 and shoulder 32 support the magnet 23 between them.

In a typical installation the vacuum tight housing 13 is made of brass having a hollow stem 10 which is ⅞ inch long, the bore 10a accommodating packing drive shaft 19. The outer diameter of the stem 10 is sized to fit the column to which it is attached. Within the housing 13 the inner face of the bottom wall is undercut about ¹⁄₃₂ inch to provide annular raised shoulder 14 accommodating the ball bearing assembly 15 which may be a New Departure No. 3201. The outer race of this bearing 15 is in compression between the disc 21 and the lower housing 13a.

The connecting shaft or drive pin 17 is likewise made of brass and the bore 22a in lower magnet 22 is about 0.28 inch diameter and is in a slip fit over the upper end 17a of the connecting shaft 17. This magnet, as well as the upper exterior magnet 23 may be a General Electric Cast Alnico No. 71D1022P4. The set screw 20 is provided to hold the packing drive shaft 19 to prevent free rotation of the magnet 22 relative to the drive pin 17 and shaft 19, and to avoid upward axial movement of the magnet. The lower end of the drive pin 17 is in a press fit with the inner race of bearing 15. Over the bearing 15 is a brass bearing spacer 21 which may be about 1.25 inches in diameter and 0.25 inch thick with a bore 28 of about 0.5 inch diameter to slip over the lower enlarged portion 17b of the drive pin 17. On its lower side it is undercut ¹⁄₃₂ inch to accommodate the ball bearing assembly 15.

The seal is completed by threading a brass upper housing 13b into the corresponding threads of the lower housing 13a. These threads are 15/16–32 threads. The upper housing 13b has an outer diameter of 1.25 inches and cylindrical walls of about the same length.

With a vacuum seal and magnetic drive of this type, continuous distillations of as much as 120 hours have been made during which constant absolute pressures as low as 0.1 mm. have been maintained. The magnetic drive, which ordinarily operates at 1500 to 2000 R. P. M., does not lose speed or uncouple even when viscous samples are being distilled. The magnet is normally accelerated from dead stop to full speed in 10 to 15 seconds. Bearing life has been excellent and has averaged about 6 months of operation. Thus, this type of vacuum seal and magnetic drive has permitted full utilization of spinning band columns operated under vacuum.

This device has been described in connection with its use on a spinning band column and under vacum, but the seal need not be removed for atmospheric operation and in addition permits constant pressure, e. g. 760 mm. Hg operation of the column. Without this seal it is probable that light components may diffuse upwards through a drive shaft opening and be lost as far as the distillation is concerned.

Although a preferred form of our invention has been described in some detail, it is to be understood that this is by way of illustration only and that changes may be made by those skilled in the art within the scope of our invention described herein. For example, in the illustrated embodiment two separate poles are shown on the cylindrical magnets. However, it is contemplated that instead of having an air gap between the poles, we may employ a non-magnetic, e. g. brass, insert. Similarly a multiplicity of pairs of poles may be provided by a series of radially extending brass inserts.

We claim:

1. A magnetic power takeoff unit comprising a housing, said housing comprising a pair of opposed cylindrical chambers adapted to be joined in axial threaded engagement, a vertical shaft extending into said housing, a drive pin within said housing fixed to said shaft, a bearing assembly within said housing fixed to a lower portion of said pin, an annular spacer disc above said roller bearing assembly and within said housing, a cylindrical magnet fixed to said drive pin, said disc serving the function of retaining the roller bearing assembly and drive pin within the lower part of said housing and preventing axial travel of the pin and magnet within said housing, and a stop means between said drive pin and said vertical shaft, said stop means serving the additional function of preventing rotation of said cylindrical magnet relative to said vertical shaft and of preventing axial travel along said pin.

2. A magnetic drive and vacuum seal for a spinning fractionation column comprising a vacuum tight housing adapted to be fixed to the upper end of said column, a drive shaft for a spinning band extending upwardly into said housing, a drive pin within said housing, a longitudinal bore in said drive pin adapted to receive the upper end of said drive shaft, bearing means supporting said drive pin within said housing, a stop means linking said drive pin and said drive shaft, a permanent magnet removably supported by said drive pin within said housing, an axial bore in said magnet, a transverse slot in the upper portion of said magnet, said stop means engaging the bottom wall of said slot and serving the additional function of preventing free rotation of the magnet about said drive pin, and a driven permanent magnet mounted exterior of said housing and in axial alignment with said drive shaft.

3. A magnetic power takeoff unit comprising a housing adapted to close an opening in a vessel, a first permanent magnet rotatably supported within said housing, an elongated drive pin disposed within said housing and rotatably supporting said magnet, a drive shaft extending from said vessel into said housing, a longitudinal bore in said drive pin receiving the upper end of said drive shaft, bearing means rotatably supporting said drive pin within said housing, stop means linking said drive pin and said drive shaft, an axial bore in said magnet receiving said drive pin, transverse slot means in the upper portion of said magnet dividing said portion into magnetic poles, said stop means engaging said slot means and preventing longitudinal travel of said magnet within said housing, and a driven permanent magnet mounted exterior of said housing and in substantially axial alignment with said drive shaft, said driven magnet having a plurality of spaced poles at one end thereof adapted to magnetically link with the magnetic poles of said first permanent magnet.

4. The magnetic power take-off unit of claim 3 wherein said housing comprises a cylindrical chamber confining said bearing means, and a hollow stem extending axially of said chamber.

5. A magnetic power takeoff unit comprising a separable casing, said casing being provided with a cylindrical chamber near the upper end thereof, an elongated shaft guide means extending axially of said chamber, a first magnet rotatably supported within said chamber, an elongated drive pin disposed within said casing and rotatably supporting said magnet within said chamber, antifriction bearing means within said casing and supporting said drive pin, a drive shaft extending axially of said chamber through said shaft guide into said chamber, longitudinal bore in said drive pin receiving an end of said drive shaft, stop means linking said drive pin and said drive shaft, an axial bore in said first magnet accommodating a portion of said drive pin, transverse slot means in the upper portion of said magnet dividing said portion into separate magnetic poles, said stop means extending into said slot means and restraining said first magnet against longitudinal travel within said casing, and driving magnet means disposed in opposition to said first magnet adjacent a wall portion of said casing and substantially in alignment with said first magnet, said driving magnet having a plurality of spaced poles adapted to magnetically link with the magnetic poles of said first magnet in said casing whereby rotation of said driving magnet rotates said first magnet, the said drive pin, and the said drive shaft.

References Cited in the file of this patent

UNITED STATES PATENTS

| | | |
|---|---|---|
| 1,962,538 | Toney | June 12, 1934 |
| 2,560,940 | Findley | July 7, 1951 |
| 2,589,134 | Pyle | Mar. 11, 1952 |
| 2,601,076 | Winther | June 17, 1952 |
| 2,613,176 | Goldsbarry | Oct. 7, 1952 |

FOREIGN PATENTS

| | | |
|---|---|---|
| 235,022 | Great Britain | June 11, 1925 |
| 478,002 | Germany | June 17, 1929 |